Oct. 24, 1961 — E. S. GANDRUD — 3,005,356
SPROCKET AND BUSHING THEREFOR
Filed Jan. 12, 1959

INVENTOR.
EBENHARD S. GANDRUD
BY
ATTORNEYS

United States Patent Office 3,005,356
Patented Oct. 24, 1961

3,005,356
SPROCKET AND BUSHING THEREFOR
Ebenhard S. Gandrud, Box 269, Owatonna, Minn.
Filed Jan. 12, 1959, Ser. No. 786,217
1 Claim. (Cl. 74—230.11)

My invention relates generally to rotary power transmission devices, such as sprockets, gears, and pulleys, and more particularly to such devices utilized to transmit power to auxiliary power driven apparatus on farm implements, or other such equipment.

In equipment of the type above described, it is frequently found desirable and necessary to attach a pulley or sprocket to a shaft, the opposite ends of which are rendered in accessible by virture of their being received in bearings and the like, without removing the shaft in either end thereof from said bearings.

The primary object of my invention is the provision of a novel and highly efficient sprocket or the like which may be quickly and securely attached to a shaft between bearings or the like in a minimum of time and with a minimum of labor, and without removing the shaft from the bearings. To this end I provide such a power transmission device which comprises a pair of cooperating body sections which are adapted to encompass a shaft and means for securely locking said body sections together to provide a complete sprocket, pulley or the like.

Another important object of my invention is the provision of a device as set forth having novel means whereby the same may be applied to shafts of various sizes and of various cross-sectional shapes. To accomplish this purpose, the above mentioned body sections cooperate to define a relatively large axial passage for the reception of cooperating bushing sections, which bushing sections cooperate to define an axial passage of relatively smaller size for the reception of said shaft.

Another object of my invention is the provision of a drive element and bushing construction as set forth having means for positively limiting axial movement of the bushing sections with respect to the body sections of said transmission device.

Still another object of my invention is the provision of a power transmission device as set forth which is simple and inexpensive to produce, which is easy to install, rugged in construction, and durable in use.

The above and still further objects of my invention will become apparent from the following detailed specification, appended claims and attached drawings.

Referring to the drawings wherein like characters indicate like parts throughout the several views.

Figure 1:
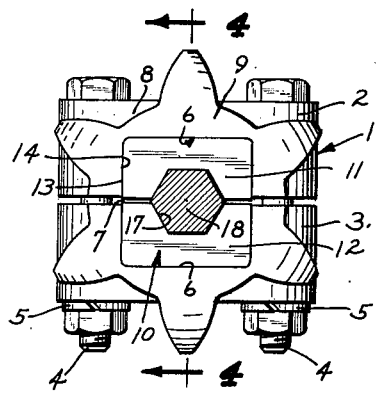
FIG. 1 is a view in end elevation of a sprocket device formed in accordance with my invention, shown as being mounted on a drive shaft.
Figure 2:
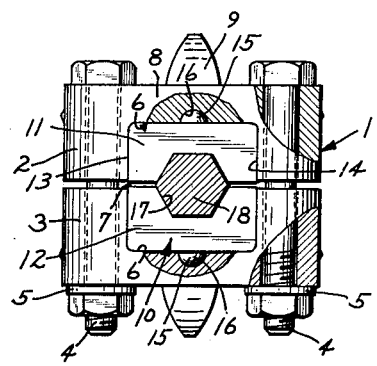
FIG. 2 is a view in elevation as seen from the end opposite that shown in FIG. 1, some parts being broken away and some parts shown in section.
Figure 3:
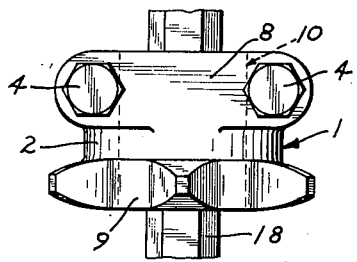
FIG. 3 is a view in top plan.
Figure 4:
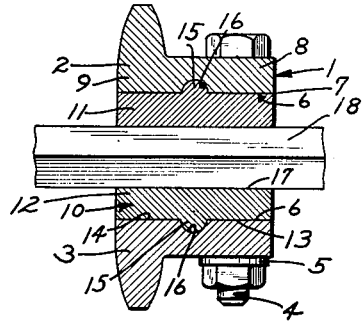
FIG. 4 is an axial section taken substantially on the line 4—4 of FIG. 1.
Figure 5:
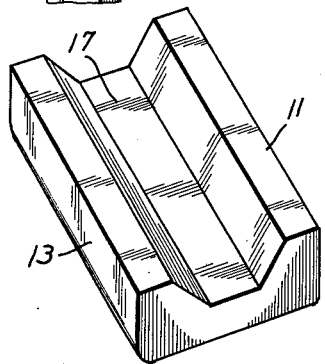
FIG. 5 is a view in perspective of one of the bushing sections illustrated in FIGS. 1 to 4 inclusive.

Referring with greater particularity to the drawings and initially to the structure of FIGS. 1 to 5 thereof, the numeral 1 indicates in its entirety a sprocket body formed from relatively hard strong metal, such as cast iron, to provide a pair of opposed cooperating mating body sections 2, 3. The body sections 2, 3 are releasably locked together by laterally spaced nut-equipped clamping bolts 4, preferably and as shown having conventional lock washers 5 thereon. Intermediate the clamping bolts 4 and extending at right angles thereto, the sections 2, 3, are channeled as at 6 to define a non-circular, shown as being polygonal, opening 7 extending therethrough. It will be noted that axially of the opening 7, the body sections 2, 3 define hub and sprocket or driving portions 8 and 9 respectively at opposite ends.

Receivable in the cross-sectionally non-circular opening 7 through the body 1 is a bushing, identified in its entirety by the numeral 10 and also comprising a pair of mating bushing sections 11, 12. The bushing 10 is preferably formed from relatively softer metal than the body 1, for a purpose which will hereinafter be more fully explained. To insure common rotation of the bushing 10 with the body 1 about the axis of the opening 7, it will be noted that the outer peripheral surface 13 of the former is shaped to conform to the peripheral surface 14 defined by the opening 7. To lock the bushing 10 against movements axially of the opening 7, each of the sections 11, 12 is provided with one or more radially outwardly extending detents or lugs 15 which are nestingly received within mating recesses 16 in the body sections 2, 3.

As shown, the bushing sections 11, 12 are channeled to define a central opening 17 which is concentric with the opening 7 through the body 1. As shown, the opening 17 is polygonal, preferably hexagonal, in cross section. Furthermore, the transverse dimensions of both sections 2, 3, and the bushing sections 11, 12, longitudinally of the clamping bolts 4, is such as to insure clamping pressure being exerted upon a rotary shaft 18 received within the polygonal opening 17. With this arrangement, it is not only possible to install my novel sprocket device upon a shaft 18 of polygonal cross section, as shown, but also to install same on a cross sectionally circular shaft, not shown. With this latter arrangement, the relatively soft, ductile metal bushing 10 exerts sufficient clamping pressure against the circular shaft at circumferentially spaced points to assure common rotation of the body 1 therewith.

Figure 6:
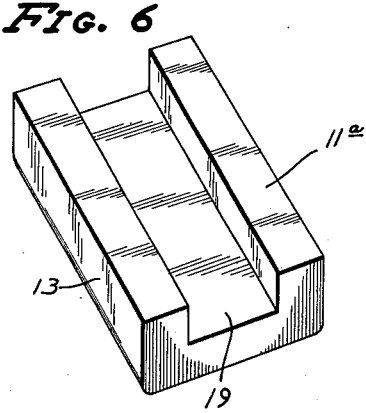
FIG. 6 is a view corresponding to FIG. 5 but showing a modified form of bushing section.

In FIG. 6, I show a bushing section 11a having a channel 19 therethrough which, in cooperation with a matching bushing section defines a cross-sectionally substantially square opening for the reception of a shaft, not shown, of similar cross sectional shape.

Figure 7:
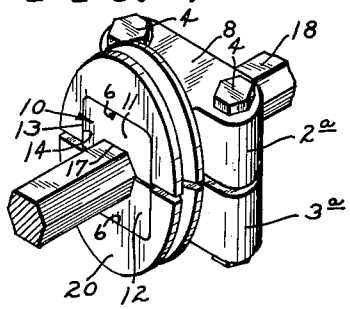
FIG. 7 is a view in perspective showing a pulley constructed in accordance with my invention.

In the structure of FIG. 7, the body sections 2a, 3a define a sheave 20 at one end instead of a sprocket. In all other respects, the device is identical to that of FIGS. 1 to 5 inclusive.

My invention has been thoroughly tested and found to be completely satisfactory for the accomplishment of the above objects; and while I have shown a preferred embodiment of my improved power transmission device and a modified form thereof, I wish it to be understood that same is capable of further modification without departure from the scope and spirit of the invention as defined in the appended claims.

What I claim is:

A transversely separable transmission attachment for power shafts comprising a pair of elongated transversely separable outer body sections cooperating to define a cross-sectionally non-circular axial opening therethrough, a pair of elongated transversely separable inner body sections of equal length with said outer body sections and cooperating to define a cross-sectionally non-circular inner body fitting said axial opening through said outer body sections, said outer body sections having cooperating semicircular central portions, a pair of cooperating drive portions joining one end of said outer central body portion about one end of said inner body sections, and a pair of cooperating clamping portions joining the opposite ends of said outer central body portion about the other ends of said inner body section, whereby to securely mount and attach said drive and body portions of said attachment on power shafts of varying shapes and dimensions.

References Cited in the file of this patent

UNITED STATES PATENTS

| | | |
|---|---|---|
| 393,936 | Tecktonius | Dec. 4, 1888 |
| 548,191 | Griscom | Oct. 22, 1895 |
| 565,526 | Turner | Aug. 11, 1896 |
| 569,850 | Babcock | Oct. 20, 1896 |
| 593,646 | Donovan | Nov. 16, 1897 |
| 1,382,829 | Gilbert | June 28, 1921 |
| 1,405,590 | Hudson | Feb. 7, 1922 |
| 1,593,936 | Goodwin | July 27, 1926 |
| 1,682,927 | Nielsen | Sept. 4, 1928 |
| 1,815,663 | Barry | July 21, 1931 |
| 2,465,570 | Bocchino | Mar. 29, 1949 |